United States Patent [19]

Chang et al.

[11] Patent Number: 5,382,037
[45] Date of Patent: Jan. 17, 1995

[54] FORK BLADE FOR A BICYCLE FRONT FORK

[76] Inventors: Wu-Sung Chang; Huan-Yang Huang, both of No. 5-15, Lun Ya Lane, Lun Ya Lee, Yuanlin Chen, Changhwa Hsien, Taiwan, Prov. of China

[21] Appl. No.: 183,762
[22] Filed: Jan. 21, 1994
[51] Int. Cl.6 ............................................. B62K 25/08
[52] U.S. Cl. .................................. 280/276; 280/279
[58] Field of Search ............... 280/276, 277, 279, 275, 280/284, 288

[56] References Cited

U.S. PATENT DOCUMENTS

| | | | |
|---|---|---|---|
| 5,238,259 | 8/1993 | Wilson et al. | 280/279 X |
| 5,284,352 | 2/1994 | Chen | 280/276 |
| 5,301,973 | 4/1994 | Truchinski | 280/276 |

FOREIGN PATENT DOCUMENTS

| | | | |
|---|---|---|---|
| 2742701 | 3/1978 | Germany | 280/276 |
| 0679960 | 9/1952 | United Kingdom | 280/276 |

Primary Examiner—Margaret A. Focarino
Assistant Examiner—Florian Zeender
Attorney, Agent, or Firm—Varndell Legal Group

[57] ABSTRACT

A fork blade for a bicycle front fork includes a lower cylindrical casing, an upper cylindrical casing having a reduced bottom end inserted into the lower cylindrical casing, a forked tip member welded to the lower cylindrical casing at the bottom, a double end screw rod having a top end screwed up with locknuts to hold a buffer spring above a hollow screw member being fastened to the bottom end of the upper cylindrical casing and a bottom end connected to the forked tip member, a shock spring retained between the hollow screw member and the forked tip member, wherein the forked tip member has a circular upright wall welded to the inside wall of the lower cylindrical casing at the bottom and welding holes through the circular upright wall into which the melted metal for joining the forked tip member and the lower cylindrical casing fills.

1 Claim, 3 Drawing Sheets

FORK BLADE FOR A BICYCLE FRONT FORK

BACKGROUND AND SUMMARY OF THE INVENTION

The present invention relates to a bicycle front fork, and relates more particularly to an improved structure of fork blade for a bicycle front fork which is easy to install, and which provides a satisfactory shock absorbing function.

The fork blades of the front fork of a bicycle are commonly made in two parts, namely, the upper cylindrical casing and the lower cylindrical casing that slide one inside the other. A shock absorbing device is retained within each fork blade to absorb shocks. The shock absorbing device, as shown in FIG. 1, is a shock spring retained between an upper annular block fastened inside the upper cylindrical casing and a lower annular block fastened inside the lower cylindrical casing. The installation of the upper and lower annular blocks is complicated. Before the installation of the upper and lower annular blocks, respective holes must be made on the upper and lower cylindrical easing so that the upper and lower annular block can be respectively fastened to the upper and lower cylindrical casing through a welding process. After the process of welding, the welded area must be polished. This complicated procedure greatly increases the manufacturing cost of the front fork.

The present invention has been accomplished to provide a fork blade for a bicycle front fork which eliminates the aforesaid drawbacks. According to the preferred embodiment of the preset invention, the fork blade comprises a lower cylindrical casing, the upper cylindrical casing having a reduced bottom end inserted into the lower cylindrical casing, a forked tip member welded to the lower cylindrical casing at the bottom, a double end screw rod having a top end screwed up with locknuts to hold a buffer spring above a hollow screw member being fastened to the bottom end of the upper cylindrical casing and a bottom end connected to the forked tip member, a shock spring retained between the hollow screw member and the forked tip member, wherein the forked tip member comprises a circular upright wall welded to the inside wall of the lower cylindrical casing at the bottom and welding holes through the circular upright wall into which the melted metal for joining the forked tip member and the lower cylindrical casing fills.

DETAILED DESCRIPTION OF THE PREFERRED EMBODIMENT

Figures 1A, 1B:
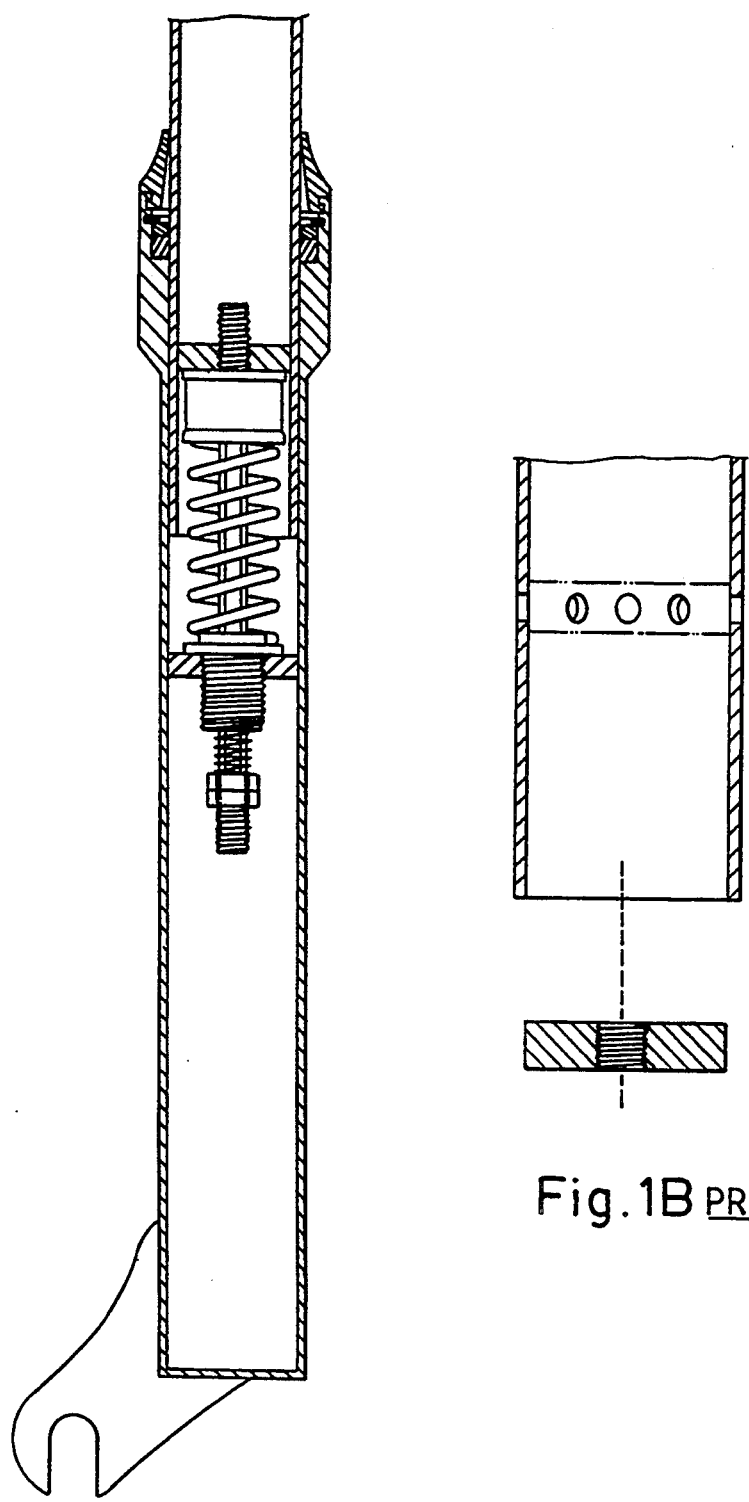
FIG. 1A is a longitudinal view in section of a fork blade for a bicycle front fork according to the prior art.
FIG. 1B shows holes made on the fork block for mounting an annular block according to the prior art.
Figure 2:
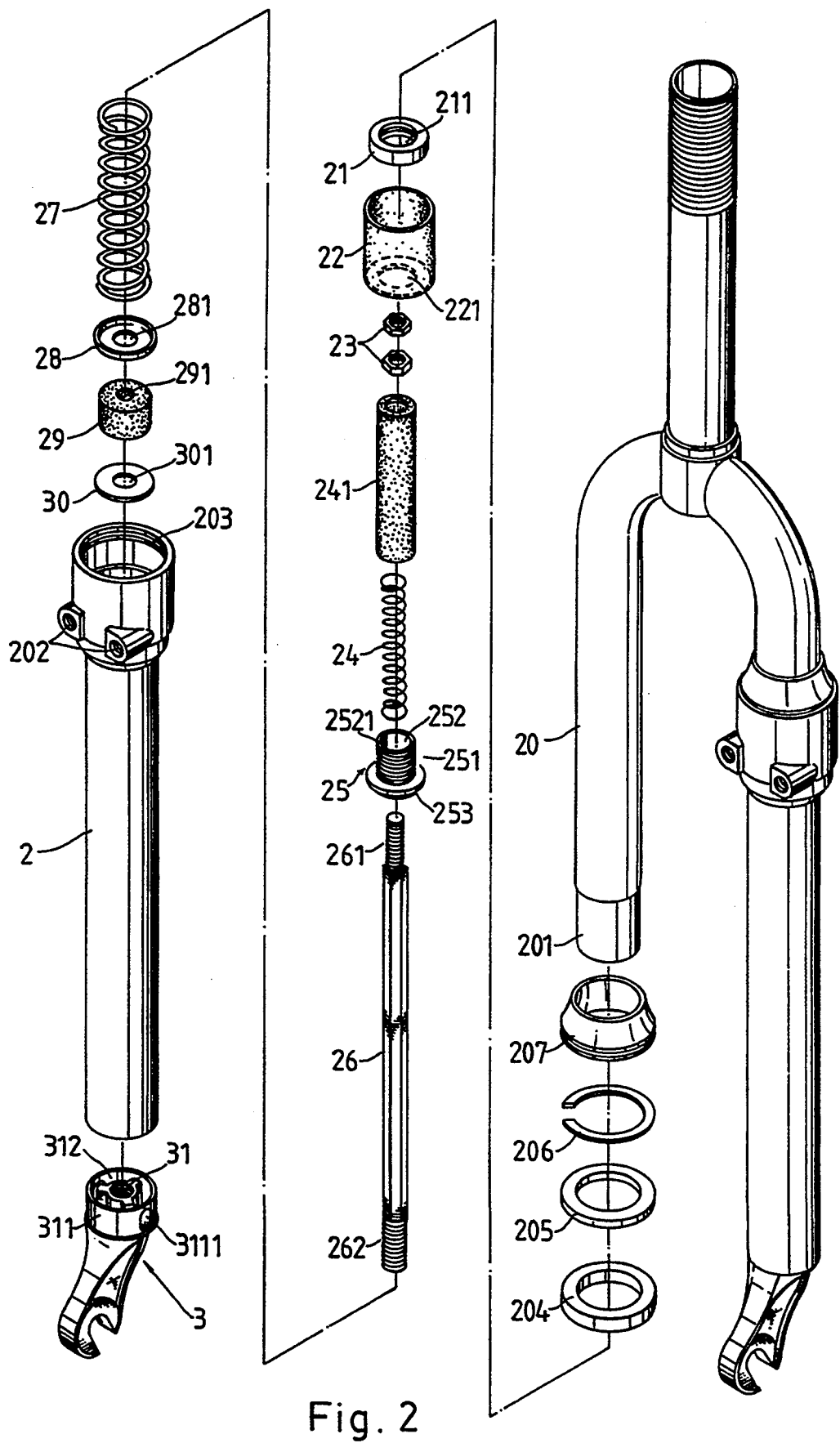
FIG. 2 is an exploded view of a fork blade for a bicycle front fork according to the preferred embodiment of the present invention.
Figures 3A, 3B:
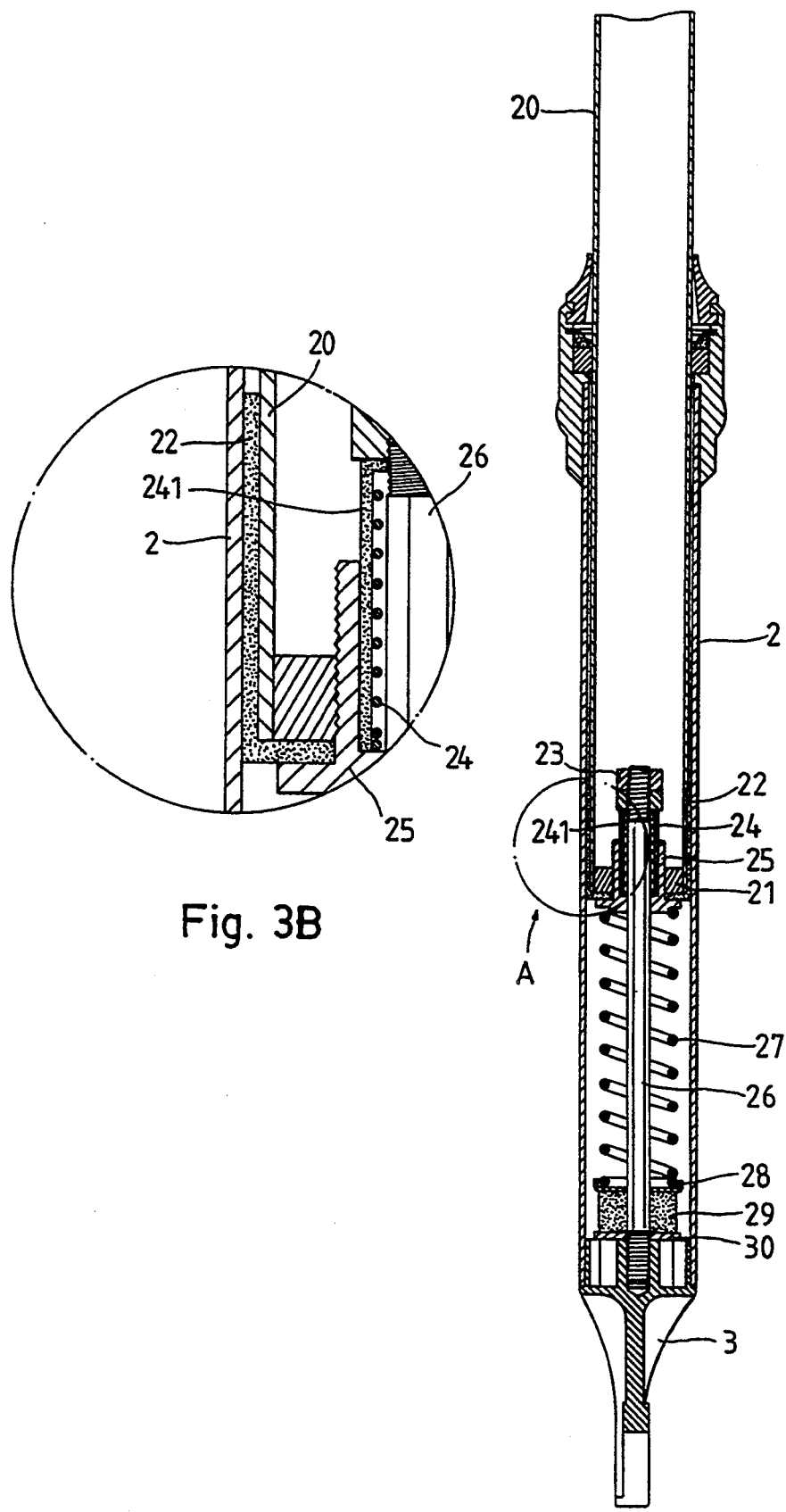
FIG. 3A is a longitudinal view in section of the fork blade shown in FIG. 2.
FIG. 3B is a partial view in an enlarged scale of part A of FIG. 3A.

Referring to FIGS. 2, 3A and 3B, the front fork of a bicycle is comprised of two symmetrical fork blades. Each fork blade is comprised of an upper cylindrical casing 20, and a lower cylindrical casing 2 which receive the lower part of the upper cylindrical casing 20.

The upper cylindrical casing 20 has a reduced bottom end 201 inserted into the lower cylindrical casing 2. A ring nut 21 is welded to the reduced bottom end 201 of the upper cylindrical casing 20 on the inside in a flush manner, having a threaded center hole 211. A wear cap 22 is mounted around the reduced bottom end 201 of the upper cylindrical casing 20, having a hole 221 through the longitudinal center thereof in line with the threaded center hole 211 on the ring nut 21. There is provided a hollow screw member 25 fastened to the wear cap 22 and the ring nut 21 to hold a flexible protective sleeve 241 and a buffer spring 24 inside the upper cylindrical casing 20. The hollow screw member 25 comprises an outer thread 251 inserted through the hole 221 on the wear cap 22 and threaded into the threaded center through hole 211 on the ring nut 21, a head 253 stopped outside the wear cap 22 at the bottom, a stepped longitudinal through hole 252 formed of an upper hole 2521 and a bottom hole (not shown) linked to the upper hole 2521. The bottom hole is relatively smaller in diameter than the upper hole 2521 and the buffer spring 24. The buffer spring 24 is protected within the flexible protective sleeve 241 received in the upper hole 2521 of the stepped longitudinal through hole 251. There is a double end screw rod 26 having a first outer thread 261 at one end inserted through the stepped longitudinal through hole 252 on the hollow screw member 25 and the buffer spring 24 and then screwed up with two locknuts 23 supported above the flexible protective sleeve 241, and a second outer thread 262 at an opposite end inserted through a shock spring 27, the center hole 281 of a shock spring holder disk 28, the center hole 291 of a circular rubber block 29, the center hole 301 of a washer 30, and the lower cylindrical casing 2, and then threaded into a center screw hole 31 on a forked tip 3. The lower cylindrical casing 2 comprises an expanded top end 203, which receives an oil seal ring 204, an axle bush 205, a spring clamp 206, and a dust cap 207, having two mounting screw holes 202. The oil seal ring 204, axle bush 205, spring clamp 206, and dust cap 207 are received within the expanded top end 203 of the lower cylindrical casing 2 and mounted around the upper cylindrical casing 20. The forked tip 3 comprises a circular upright wall 311 fitted into the bottom opening (not shown) of the lower cylindrical casing 2 and then affixed thereto through a welding process, a center screw hole 31 at the top spaced from the circular upright wall 311 by equal spaces 312, which receives the second outer thread 262 of the double end screw rod 26, and a plurality of through holes 3111 spaced around the circular upright wall 311 in communication with the spaces 312 respectively, into which the melted metal for joining the tip member 3 and the lower cylindrical casing 2 fills.

We claim:

1. A fork blade for a front fork of a bicycle of the type comprised of a lower cylindrical casing, and an upper cylindrical casing having a reduced bottom end inserted into said lower cylindrical casing, the improvement comprising:

a ring nut welded to the reduced bottom end of said upper cylindrical casing on an inside portion of the cylindrical casing having a threaded center hole;

a wear cap mounted around the reduced bottom end of said upper cylindrical casing, having a hole aligned with the threaded center hole of said ring nut;

a hollow screw member which comprises a head stopped outside said wear cap, an outer thread inserted through the hole on said wear cap and threaded into the threaded center hole of said ring nut, and a stepped longitudinal through hole;

a buffer spring received in the stepped longitudinal through hole of said hollow screw member and supported above the head of said hollow screw member;

a flexible protective sleeve received in the stepped longitudinal through hole of said hollow screw member to hold said buffer spring within said sleeve;

a forked tip member welded to said lower cylindrical casing at a bottom end of the lower cylindrical casing;

a double end screw rod received inside said lower cylindrical casing, having a first outer thread on a top end thereof inserted through the stepped longitudinal through hole on said hollow screw member and a longitudinal center hole on said buffer spring, and screwed up with locknuts to retain said buffer spring and said flexible protective sleeve between said hollow screw member and said locknuts, and a second outer thread on a bottom end thereof connected to said forked tip member;

a circular rubber block mounted around said double end screw rod and supported on a washer above said forked tip member;

a shock spring mounted around said double end screw rod, having a top end stopped at the head of said hollow screw member and a bottom end supported on a ring-shaped shock spring holder member above said circular rubber block;

wherein said forked tip member comprises a circular upright wall at a top end welded to said lower cylindrical casing on an inside portion of the lower cylindrical casing, a center screw hole spaced from said circular upright wall by equal spaces, the center screw hole receives the second outer thread of said double end screw rod, and a plurality of through holes each spaced around said circular upright wall in communication with each of said equal spaces into which melted metal for joining said forked tip member and said lower cylindrical casing fills.

* * * * *